No. 755,149. PATENTED MAR. 22, 1904.
J. M. W. LONG.
DRAFT EVENER.
APPLICATION FILED JAN. 25, 1904.
NO MODEL.
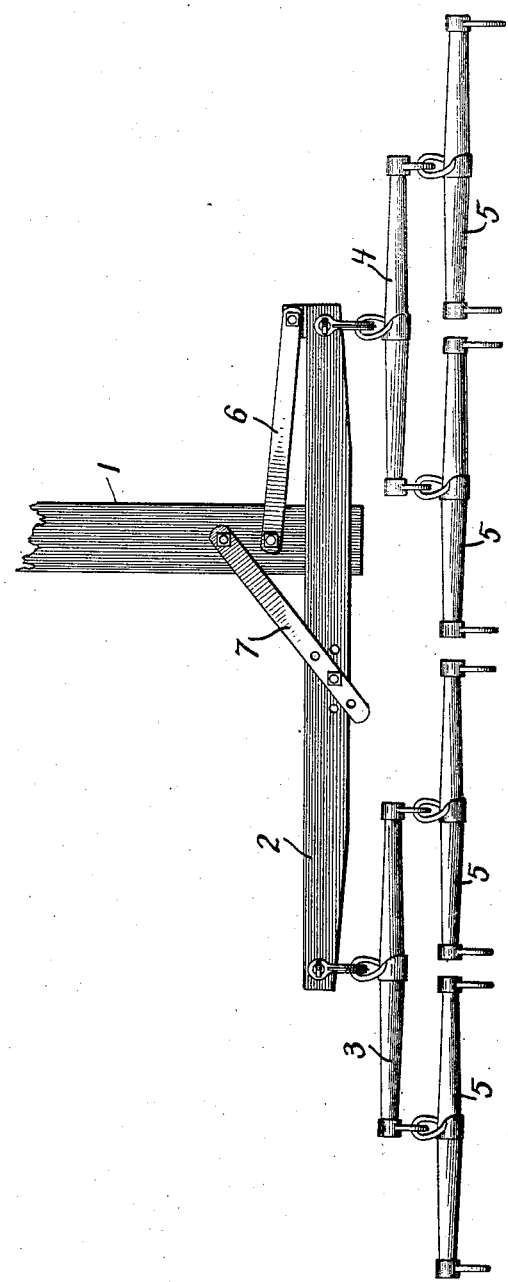
Witnesses
G A Raubenschmidt
M. S. Belden
John M. W. Long Inventor
by James W. See.
Atty No. 755,149.                                           Patented March 22, 1904.

UNITED STATES PATENT OFFICE.

JOHN M. W. LONG, OF HAMILTON, OHIO, ASSIGNOR TO THE LONG & ALLSTATTER COMPANY OF HAMILTON, OHIO.

DRAFT-EVENER.

SPECIFICATION forming part of Letters Patent No. 755,149, dated March 22, 1904.

Application filed January 25, 1904. Serial No. 190,433. (No model.)

*To all whom it may concern:*

Be it known that I, JOHN M. W. LONG, a citizen of the United States, residing at Hamilton, Butler county, Ohio, (post-office address, No. 631 High street, Hamilton, Ohio,) have invented certain new and useful Improvements in Eveners, of which the following is a specification.

This invention pertains to improvements in eveners designed for use in cases where the point of attachment to the load, as an agricultural implement, is offset from the line of draft or center of application of power and in which the power represented by the team is liable to be unsymmetrical, as where one team of heavy horses is used in connection with a team of light horses.

My invention will be readily understood from the following description, taken in connection with the accompanying drawing, which is a plan of my improved evener rigged for four horses.

In the drawing, 1 indicates the tongue, say, of an agricultural implement; 2, the evener-bar attached to the tongue, but with its center of length disposed considerably to one side of the tongue; 3 and 4, the doubletrees, one at each end of the evener-bar; 5, the swingletrees; 6, a radius-bar lying substantially parallel with the evener-bar and having its inner end pivoted to the tongue and having its outer end pivoted to that end of the evener-bar projecting the lesser distance to the side of the tongue, and 7 a drag-link having its rear end pivoted to the tongue and having its forward end pivoted at the substantial center of length of the evener-bar, this hitch-link being disposed at an angle to the evener-bar. The strain of draft from the evener-bar to the tongue is of course transmitted in its substantial entirety, through the hitch-link 7, the radius-bar 6 serving to maintain with substantial constancy the offsetting angularity of the hitch-link.

The device is illustrated as being provided with doubletrees and swingletrees suited for the use of four horses; but it is manifest that it may be rigged for two horses.

It is to be observed that drag-link 7 has a series of holes at its forward end, where it attaches to the evener-bar, and that the evener-bar has a series of holes. The illustration shows the drag-bar and evener-bar as being connected by a pivot engaging the intermediate hole in each series. If it should happen that the team at doubletree 3 were considerably lighter than the team at doubletree 4, then the pivot uniting the drag-link to the evener-bar can be shifted toward doubletree 4 by change of holes for the pivot, thus shortening the end of the evener-bar on which doubletree 4 acts, and, conversely, that end of the bar may be lengthened by an appropriate shifting of the pivot. This shifting of the pivot in question is not interfered with by radius-bar 6.

I claim as my invention—

1. In an evener, the combination, substantially as set forth, of a tongue, an evener-bar at right angles thereto and having its center of length at one side of the tongue, hitching devices at each end of the evener-bar, a radius-bar disposed substantially parallel with the evener-bar and having its inner end pivoted to the tongue and having its outer end pivoted to that end of the evener-bar having the lesser projection to the side of the tongue, and an angularly-disposed drag-link having its rear end pivoted to the tongue and having its forward end pivoted near the mid-point in the length of the evener-bar.

2. In an evener, the combination, substantially as set forth, of a tongue, an evener-bar at right angles thereto and having its center of length at one side of the tongue, hitching devices at each end of the evener-bar, a radius-bar disposed substantially parallel with the evener-bar and having its inner end pivoted to the tongue and having its outer end pivoted to that end of the evener-bar having the lesser projection to the side of the tongue, and an angularly-disposed drag-link having its rear end pivoted to the tongue and having its forward end pivoted near the mid-point in the length of the evener-bar, the evener-bar and the drag-link being provided each with a longitudinal series of pivot-holes for selective use in pivoting these parts together.

JOHN M. W. LONG.

Witnesses:
JAMES W. SEE,
M. P. BELDEN.